(12) United States Patent
Kim et al.

(10) Patent No.: US 11,112,281 B2
(45) Date of Patent: Sep. 7, 2021

(54) COVERING DEVICE FOR PROTECTING ANEMOMETER ENGAGED WITH EXTERNAL FRAME MOUNTED ON VEHICLE

(71) Applicant: National Institute of Meterological Sciences, Jeju-do (KR)

(72) Inventors: Geon Tae Kim, Gangneung-si (KR); Seon Jeong Kim, Gangneung-si (KR); Bo Young Ahn, Gangneung-si (KR); Hyoung Gu Nam, Gangneung-si (KR); Hyun Bong Kim, Gangneung-si (KR); Jeong Sun Lee, Gangneung-si (KR); Yoon Sook Shin, Gangneung-si (KR); Baek Jo Kim, Gangneung-si (KR)

(73) Assignee: NATIONAL INSTITUTE OF METEOROLOGICAL SCIENCES, Seogwipo-si (KR)

( * ) Notice: Subject to any disclaimer, the term of this patent is extended or adjusted under 35 U.S.C. 154(b) by 17 days.

(21) Appl. No.: 16/916,144

(22) Filed: Jun. 30, 2020

(65) Prior Publication Data
US 2021/0003427 A1     Jan. 7, 2021

(30) Foreign Application Priority Data

Jul. 4, 2019 (KR) .......................... 10-2019-0080947

(51) Int. Cl.
*G01P 13/02*   (2006.01)
*G01W 1/02*   (2006.01)
*G01D 11/24*   (2006.01)

(52) U.S. Cl.
CPC .............. *G01D 11/24* (2013.01); *G01P 13/02* (2013.01); *G01W 1/02* (2013.01)

(58) Field of Classification Search
CPC .... G01D 11/24; G01D 11/245; G01N 1/2252; B60R 11/00; B60R 2011/004; B60R 21/01512
(Continued)

(56) References Cited

U.S. PATENT DOCUMENTS

| 5,939,645 | A  | * | 8/1999 | Kellerman | .............. G01F 1/115 73/861.94 |
| 6,885,968 | B2 | * | 4/2005 | Breed | ..................... G01S 7/481 702/143 |

(Continued)

FOREIGN PATENT DOCUMENTS

| CN | 207832817 U | * 12/2017 |
| CN | 207832817 U |   9/2018 |

(Continued)

*Primary Examiner* — Jeffrey P Aiello
(74) *Attorney, Agent, or Firm* — Ashok Tankha; Lipton Weinberger & Husick (57) ABSTRACT

A covering device for protecting an anemometer engaged with an external frame on a moving body is provided. The covering device includes: a propeller protecting part including (1_1)-st and (1_2)-nd case units for protecting a propeller, wherein space created by combining the (1_1)-st and (1_2)-nd case units holds the propeller; a body protecting part including (2_1)-st and (2_2)-nd case units for protecting a main body and its vertical tail, wherein space created by combining the (2_1)-st and (2_2)-nd case units holds the main body and the vertical tail; and a supporting member protecting part including (3_1)-st and (3_2)-nd case units for protecting a supporting member, wherein space created by combining the (3_1)-st and (3_2)-nd case units holds the supporting member; wherein the (3_1)-st and (3_2)-nd case units engage the external frame, to allow all the case units to be fixed.

6 Claims, 6 Drawing Sheets

(58) Field of Classification Search
USPC ....... 29/525.02; 73/431, 865.9; 702/2–3, 19, 702/130
See application file for complete search history.

(56) References Cited

U.S. PATENT DOCUMENTS

| | | | |
|---|---|---|---|
| 8,342,036 B2 * | 1/2013 | Khimji | G01P 5/165 |
| | | | 73/861.65 |
| 9,753,051 B2 * | 9/2017 | Schegerin | G01P 13/025 |
| 9,927,454 B2 * | 3/2018 | Summers | B63B 49/00 |
| 10,436,217 B2 * | 10/2019 | Aiello | F04D 17/162 |
| 10,464,006 B2 * | 11/2019 | Vo | B01D 46/24 |
| 2018/0045751 A1 * | 2/2018 | Kearney | G01P 5/165 |

FOREIGN PATENT DOCUMENTS

| | | | |
|---|---|---|---|
| KR | 100996513 B1 * | 3/2010 | |
| KR | 100996513 B1 | 11/2010 | |
| KR | 101585135 B1 * | 7/2014 | |
| KR | 101585135 B1 | 1/2016 | |
| KR | 20170100300 A * | 2/2016 | |
| KR | 102017010030 A | 9/2017 | |

\* cited by examiner

FIG. 1

(PRIOR ART)

FIG. 5

COVERING DEVICE FOR PROTECTING ANEMOMETER ENGAGED WITH EXTERNAL FRAME MOUNTED ON VEHICLE

CROSS-REFERENCE TO RELATED APPLICATIONS

This application claims priority to and the benefit of the non-provisional patent application titled "Covering Device For Protecting Anemometer Engaged With External Frame Mounted On Vehicle", application number KR 10-2019-0080947, filed in the Korean Intellectual Property Office (KIPO) on Jul. 4, 2019. The specification of the above referenced patent application is incorporated herein by reference in its entirety.

FIELD OF THE DISCLOSURE

The present disclosure relates to a covering device for protecting an anemometer engaged with an external frame mounted on a moving body.

BACKGROUND OF THE DISCLOSURE

Efforts to observe weather conditions that change in real time, forecast weather based on the collected data, and make use of weather observation data in various fields susceptible to meteorological phenomena, such as agriculture, have continued from the past to the present.

With the recent development of industrial technology, the performance of tools used for weather observation have also been improved, and accordingly, more accurate weather observation data can be collected, and a large amount of the weather observation data can be stored and analyzed. Nevertheless, since the ranges that the weather instruments can measure are physically limited, there may be many regions where no weather observation data can be collected. However, it is practically impossible to install the weather instruments in all the regions.

Accordingly, another conventional method for observing weather of various regions by using weather instruments mounted on a moving body was proposed.

Figure 1:
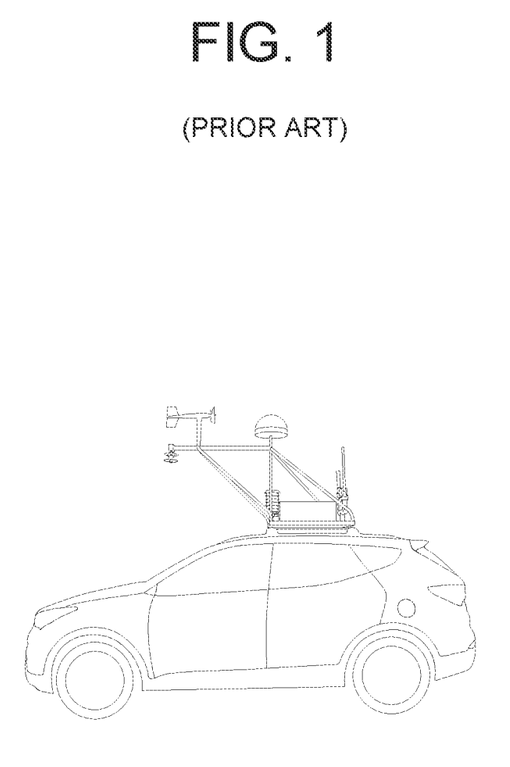
FIG. 1 is a drawing which shows a conventional method of observing weather by using an anemometer exposed to the open air, the anemometer being engaged with an external frame mounted on a moving body.

FIG. 1 is a drawing that shows said another conventional method using an anemometer mounted on the moving body. As shown in FIG. 1, the anemometer may be exposed to the open air. Also, a webpage posted on a blog managed by the Korea Meteorological Administration ("Do you know of the mobile weather observation vehicle?", Feb. 24, 2017, https://blog.naver.com/kma_131/220943561289) shows an example of the moving body, i.e., a so-called weather observation vehicle, on which various weather instruments are installed.

However, according to said another conventional method as shown in FIG. 1, a bad weather condition, external impact during the movement of the vehicle, etc. may have bad influence on the anemometer exposed to the open air.

Therefore, there is a need for additional methods or devices that can protect the anemometer mounted on the vehicle during the movement of the vehicle.

SUMMARY OF DISCLOSURE

It is an object of the present disclosure to solve the aforementioned problems.

It is another object of the present disclosure to provide a covering device for protecting an anemometer engaged with an external frame mounted on a moving body, to thereby eliminate a risk of damaging the anemometer due to external impact, etc. during the movement of the moving body.

It is still another object of the present disclosure to provide the covering device for protecting the anemometer engaged with the external frame mounted on the moving body, to thereby protect the anemometer from being contaminated or soaked during the movement and thus to improve an observation efficiency of the anemometer.

It is still yet another object of the present disclosure to provide the covering device for efficiently surrounding the whole anemometer engaged with the external frame mounted on the moving body, to thereby eliminate a need for attaching or detaching the anemometer, sensors, etc.

In accordance with one aspect of the present disclosure, there is provided a covering device for protecting an anemometer engaged with an external frame mounted on a moving body, including: a propeller protecting part which includes a (1_1)-st case unit and a (1_2)-nd case unit to be used for protecting a propeller of the anemometer, wherein the propeller is engaged with a frontal end of a main body of the anemometer and wherein first space created by combining the (1_1)-st case unit and the (1_2)-nd case unit has volume capable of holding the propeller; a body protecting part which includes a (2_1)-st case unit and a (2_2)-nd case unit to be used for protecting the main body and a vertical tail formed on a rear end of the main body, wherein second space created by combining the (2_1)-st case unit and the (2_2)-nd case unit has volume capable of holding the main body and the vertical tail of the anemometer; and a supporting member protecting part which includes a (3_1)-st case unit and a (3_2)-nd case unit to be used for protecting a supporting member capable of supporting the main body of the anemometer, wherein third space created by combining the (3_1)-st case unit and the (3_2)-nd case unit has volume capable of holding the supporting member; wherein the (3_1)-st case unit and the (3_2)-nd case unit are engaged with the external frame where the supporting member of the anemometer is combined, to thereby allow the (1_1)-st case unit, the (1_2)-nd case unit, the (2_1)-st case unit, the (2_2)-nd case unit, the (3_1)-st case unit, and the (3_2)-nd case unit to be fixed as a whole.

As one example, a first end of a reinforcing member is combined with at least one inner surface of at least one of (i) a pair comprised of the (2_1)-st case unit and the (2_2)-nd case unit, and (ii) a pair comprised of the (3_1)-st case unit and the (3_2)-nd case unit, and a second end of the reinforcing member is combined with at least one of the main body, the vertical tail, and the supporting member of the anemometer, to thereby allow external force applied to the anemometer to be reduced.

As one example, a frontal part of the propeller protecting part is shaped as a cone or a polypyramid to reduce air resistance during its movement.

As one example, the external frame includes (i) at least one main frame to be used for fixing the anemometer and (ii) one or more supportive frames to be used for connecting the main frame and the moving body, wherein one or more first grooves are formed on inner surfaces of the (3_1)-st case unit and the (3_2)-nd case unit, wherein one or more swellings are formed on the main frame, and wherein the (3_1)-st case unit and the (3_2)-nd case unit are engaged with the main frame by combining the swellings and the first grooves, and wherein one or more second grooves are formed on outer surfaces of the (3_1)-st case unit and the (3_2)-nd case unit, to thereby allow the supportive frames to pass through the second grooves and be tightly combined with the (3_1)-st case unit and the (3_2)-nd case unit.

As one example, the supporting member protecting part includes (i) a first interior protecting unit and a second interior protecting unit which are engaged with each other to protect at least part of the supporting member, and (ii) a first exterior protecting unit and a second exterior protecting unit (ii-1) which protect at least part of the supporting member or protect the first interior protecting unit and the second interior protecting unit from an outside of the first interior protecting unit and the second interior protecting unit, and (ii-2) whose degrees of overlapping the first interior protecting unit and the second interior protecting unit are adjustable, and wherein the covering device is adjusted by selecting one of three modes: (1) a first mode in which the first interior protecting unit and the second interior protecting unit are surrounded entirely by space created by combining the first exterior protecting unit and the second exterior protecting unit, (2) a second mode in which the first interior protecting unit and the second interior protecting unit are partly surrounded by the space created by combining the first exterior protecting unit and the second exterior protecting unit, and (3) a third mode in which the first interior protecting unit and the second interior protecting unit are not surrounded by the space created by combining the first exterior protecting unit and the second exterior protecting unit, and wherein the (3_1)-st case unit includes the first interior protecting unit and the first exterior protecting unit, and wherein the (3_2)-nd case unit includes the second interior protecting unit and the second exterior protecting unit.

As one example, the external frame includes (i) at least one main frame to be used for fixing the anemometer and (ii) one or more supportive frames to be used for connecting the main frame and the moving body, wherein one or more first grooves are formed on inner surfaces of the first exterior protecting unit and the second exterior protecting unit, wherein one or more swellings are formed on the main frame, and wherein the first exterior protecting unit and the second exterior protecting unit are engaged with the main frame by combining the swellings and the first grooves, and wherein one or more second grooves are formed on outer surfaces of the first exterior protecting unit and the second exterior protecting unit, to thereby allow the supportive frames to pass through the second grooves and be tightly combined with the first exterior protecting unit and the second exterior protecting unit.

As one example, the covering device includes (i) a first case, comprised of the (1_1)-st case unit, the (2_1)-st case unit, and the (3_1)-st case unit, which are configured as one body and (ii) a second case, comprised of the (1_2)-nd case unit, the (2_2)-nd case unit, and the (3_2)-nd case unit, which are configured as one body, and wherein the first case and the second case are engaged with each other.

As one example, at least one first coupling member is formed on the first case, and wherein at least one second coupling member is formed on the second case, to be engaged with the first coupling member.

As one example, at least one sealing member fills in gaps on at least one joining line on at least one external surface formed by combining the first case and the second case.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure.

In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

Figure 2:
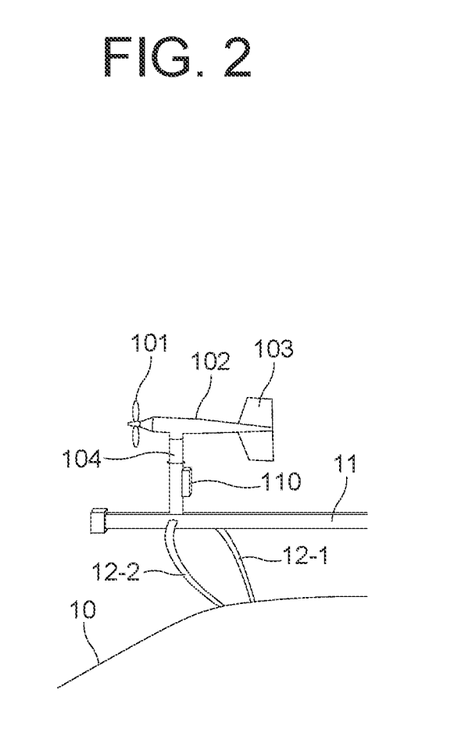
FIG. 2 is a drawing schematically illustrating the anemometer engaged with the external frame mounted on the moving body.

FIG. 2 is a drawing schematically illustrating an anemometer engaged with an external frame mounted on a moving body.

By referring to FIG. 2, the anemometer may be engaged with the external frame mounted on the moving body 10, and the external frame may include (i) at least one main frame 11 to be used for fixing the anemometer, and (ii) one or more supportive frames 12-1 and 12-2 to be used for supporting the main frame 11. Herein, the supportive frames may be mounted onto the moving body 10. And, the anemometer may include a main body 102, a propeller 101 engaged with a frontal end of the main body 102, a vertical tail 103 formed on a rear end of the main body 102, and a supporting member 104 which supports the main body 102.

Also, a measuring unit 110, e.g., the anemometer, to be used for measuring wind direction and wind speed, may be attached to the supporting member 104, and may also need to be protected.

Figure 3:
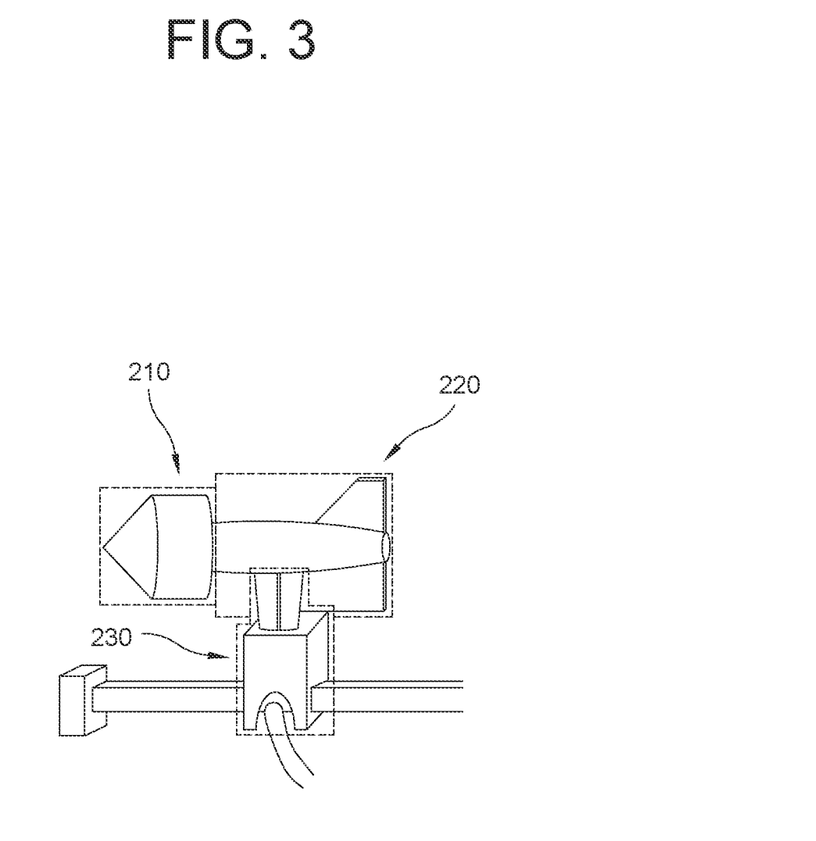
FIG. 3 is a drawing schematically illustrating a covering device for protecting the anemometer engaged with the external frame mounted on the moving body in accordance with one example embodiment of the present disclosure.
Figure 5:
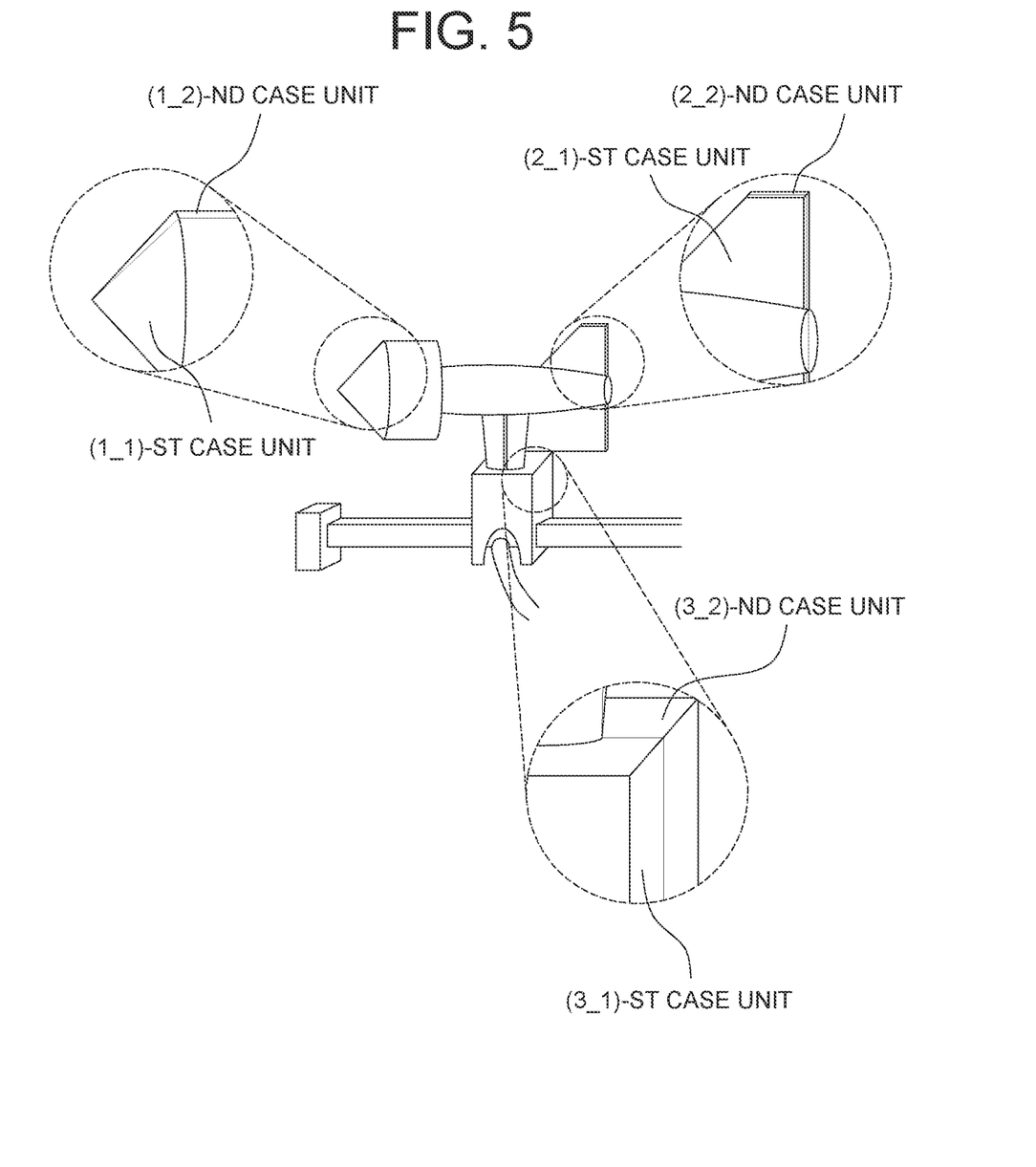
FIG. 5 is a more detailed drawing schematically illustrating the covering device of FIG. 3 in accordance with one example embodiment of the present disclosure.

FIGS. 3 and 5 are drawings schematically illustrating a covering device for protecting the anemometer engaged with the external frame mounted on the moving body in accordance with one example embodiment of the present disclosure.

By referring to FIG. 3, the covering device which protects the anemometer in accordance with one example embodiment of the present disclosure is described as follows.

First, the covering device may include a propeller protecting part 210, and the propeller protecting part 210 may include a (1_1)-st case unit and a (1_2)-nd case unit to be used for protecting the propeller 101 of the anemometer, by referring to FIG. 5, where first space created by combining the (1_1)-st case unit and the (1_2)-nd case unit may have volume capable of holding the propeller 101. Also, a frontal part of the propeller protecting part 210 may be shaped as a cone or a polypyramid to reduce air resistance of the covering device during the movement of the moving body 10. However, the frontal part of the propeller protecting part 210 does not have to be shaped as the cone or the polypyramid, and may be shaped as any other object.

Next, the covering device may include a body protecting part 220, and the body protecting part 220 may include a (2_1)-st case unit and a (2_2)-nd case unit to be used for protecting (i) the main body 102 of the anemometer and (ii) the vertical tail 103 formed on the rear end of the main body 102, by referring to FIG. 5, where second space created by combining the (2_1)-st case unit and the (2_2)-nd case unit has volume capable of holding the main body 102 and the vertical tail 103. Also, a first end of a reinforcing member (not illustrated) may be combined with at least one inner surface of the (2_1)-st case unit and the (2_2)-nd case unit, and a second end of the reinforcing member may be combined with at least one of the main body 102 and the vertical tail 103 protected by the (2_1)-st case unit and the (2_2)-nd case unit. Herein, the reinforcing member may be used for reducing external force applied to the anemometer, and the reinforcing member may be sponge, rubber, etc., but the scope of the present disclosure is not limited thereto.

And, the covering device may include a supporting member protecting part 230, and the supporting member protecting part 230 may include a (3_1)-st case unit and a (3_2)-nd case unit to be used for protecting the supporting member 104 which supports the main body 102 of the anemometer, by referring to FIG. 5, where third space created by combining the (3_1)-st case unit and the (3_2)-nd case unit has volume capable of holding the supporting member 104. Also, a first end of another reinforcing member may be combined with at least one inner surface of the (3_1)-st case unit and the (3_2)-nd case unit, and a second end of said another reinforcing member may be combined with the supporting member 104 protected by the (3_1)-st case unit and the (3_2)-nd case unit. Herein, said another reinforcing member may be used for reducing the external force applied to the anemometer.

In case that the measuring unit 110 to be used for measuring the wind direction and the wind speed is attached to the supporting member 104, then the third space created by combining the (3_1)-st case unit and the (3_2)-nd case unit may have volume capable of holding the supporting member 104 together with the measuring unit 110. And in case that said another reinforcing member is combined with the inner surface of the (3_1)-st case unit and the (3_2)-nd case unit, then said another reinforcing member may further be combined with the measuring unit 110 for reducing the external force applied to the measuring unit 110 and tightly fixing the measuring unit 110.

As described above, the supporting member protecting part 230 may include the (3_1)-st case unit and the (3_2)-nd case unit for protecting the supporting member 104. And since the supporting member 104 may be engaged with the main frame 11, the (3_1)-st case unit and the (3_2)-nd case unit for protecting the supporting member 104 may also be engaged with the main frame 11, and accordingly, the (1_1)-st case unit, the (1_2)-nd case unit, the (2_1)-st case unit, the (2_2)-nd case unit, the (3_1)-st case unit, and the (3_2)-nd case unit may be fixed as a whole. Herein, the (3_1)-st case unit and the (3_2)-nd case unit may have one or more grooves to be used for being engaged with the main frame 11, which will be described in detail below by referring to FIGS. 4A and 4B. As used in this specification and the appended claims, the grooves may be long and narrow indentations built into a material, but the scope of the present disclosure is not limited thereto, and may be short and/or broad, for example, the grooves may be cutouts, depressions, half holes, etc.

Figure 4A:
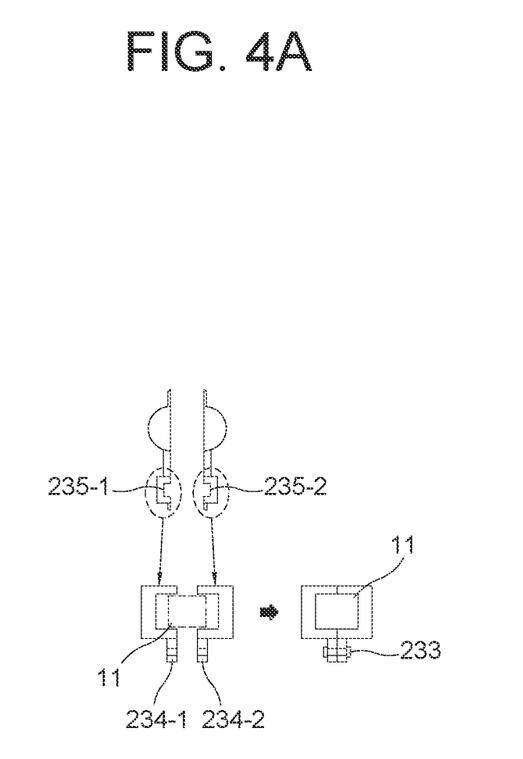
FIGS. 4A and 4B are drawings schematically illustrating the covering device separable into two parts in accordance with one example embodiment of the present disclosure.
Figure 4B:
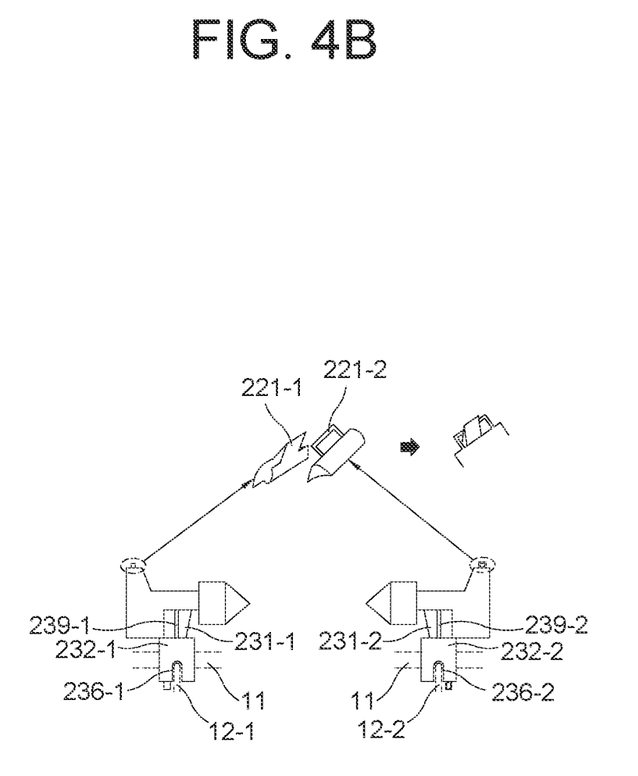

FIGS. 4A and 4B are drawings schematically illustrating components of the covering device separable into two parts in accordance with one example embodiment of the present disclosure.

By referring to FIGS. 4A and 4B, the covering device separable into the two parts in accordance with one example embodiment of the present disclosure is described as follows.

As one example, the covering device of the anemometer may include (i) a first case, comprised of the (1_1)-st case unit, the (2_1)-st case unit, and the (3_1)-st case unit, which are configured as one body and (ii) a second case, comprised of the (1_2)-nd case unit, the (2_2)-nd case unit, and the (3_2)-nd case unit, which are configured as one body, and accordingly, the covering device of the anemometer may be separable into the two parts, i.e., the first case and the second case.

By referring to FIG. 4A which illustrates the first case and the second case from a front view, each of the first grooves 235-1 and 235-2 may be formed on each of inner surfaces of each of the (3_1)-st case unit and the (3_2)-nd case unit. And each of the (3_1)-st case unit and the (3_2)-nd case unit may be engaged with the main frame 11 by using the first grooves 235-1 and 235-2 of the (3_1)-st case unit and the (3_2)-nd case unit.

And, at least one first coupling member may be formed on the first case, and at least one second coupling member may be formed on the second case. Herein, the first coupling member may be engaged with the second coupling member, and their respective locations may correspond to each other when the first case is engaged with the second case. FIG. 4A shows the first coupling member 234-1 and the second coupling member 234-2 which may be combined with each other by using one or more bolts and nuts 233.

By referring to FIG. 4B which illustrates the first case and the second case from a side view, each of the second grooves 236-1 and 236-2 may be formed on each of outer surfaces of each of the (3_1)-st case unit and the (3_2)-nd case unit. And as a result, the supportive frames 12-1 and 12-2 may respectively pass through the second grooves and be tightly combined with the (3_1)-st case unit and the (3_2)-nd case unit.

And, another first coupling member 221-1 and another second coupling member 221-2 may be respectively formed on the first case and on the second case, to thereby allow (i) the (1_1)-st case unit and the (1_2)-nd case unit or (ii) the (2_1)-st case unit and the (2_2)-nd case unit to be engaged tightly with each other. Herein, respective locations of said another first coupling member 221-1 and said another second coupling member 221-2 may correspond to each other.

Next, as another example, the supporting member protecting part 230, including the (3_1)-st case unit and the (3_2)-nd case unit, may have (i) a first interior protecting unit 231-1 and a second interior protecting unit 231-2 which may be engaged with each other to protect at least part of the supporting member 104, and (ii) a first exterior protecting unit 232-1 and a second exterior protecting unit 232-2 (ii-1) which protect at least part of the supporting member 104 or protect the first interior protecting unit 231-1 and the second interior protecting unit 231-2, from an outside of the first interior protecting unit 231-1 and the second interior protecting unit 231-2, and (ii-2) whose degrees of overlapping the first interior protecting unit 231-1 and the second interior protecting unit 231-2 are adjustable. Herein, the covering device may be adjusted by selecting one of three modes: (1) a first mode in which the first interior protecting unit 231-1 and the second interior protecting unit 231-2 are surrounded entirely by space created by combining the first exterior protecting unit 232-1 and the second exterior protecting unit 232-2, (2) a second mode in which the first interior protecting unit 231-1 and the second interior protecting unit 231-2 are partly surrounded by the space created by combining the first exterior protecting unit 232-1 and the second exterior protecting unit 232-2, and (3) a third mode in which the first interior protecting unit 231-1 and the second interior protecting unit 231-2 are not surrounded by the space created by combining the first exterior protecting unit 232-1 and the second exterior protecting unit 232-2. Herein, the (3_1)-st case unit may include the first interior protecting unit 231-1 and the first exterior protecting unit 232-1, and the (3_2)-nd case unit may include the second interior protecting unit 231-2 and the second exterior protecting unit 232-2.

Also, by referring to FIG. 4B, each of one or more length adjusting parts 239-1 and 239-2 may be formed on each of outsides of each of the first interior protecting unit 231-1 and the second interior protecting unit 231-2, where each of the length adjusting parts 239-1 and 239-2 may adjust each of the degrees of overlapping the first interior protecting unit 231-1 and the second interior protecting unit 231-2. Herein, positions and structures of the length adjusting parts 239-1 and 239-2 are not limited to what is shown in the drawings, and may vary as the case may be.

And, at least one sealing member (not illustrated) may fill in gaps on at least one joining line on at least one external surface formed by combining the first case and the second case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

We claim:

1. A covering device for protecting an anemometer engaged with an external frame mounted on a moving body, comprising:
    a propeller protecting part which includes a (1_1)-st case unit and a (1_2)-nd case unit to be used for protecting a propeller of the anemometer, wherein the propeller is engaged with a frontal end of a main body of the anemometer and wherein first space created by combining the (1_1)-st case unit and the (1_2)-nd case unit has volume capable of holding the propeller;
    a body protecting part which includes a (2_1)-st case unit and a (2_2)-nd case unit to be used for protecting the main body and a vertical tail formed on a rear end of the main body, wherein second space created by combining the (2_1)-st case unit and the (2_2)-nd case unit has volume capable of holding the main body and the vertical tail of the anemometer; and
    a supporting member protecting part which includes a (3_1)-st case unit and a (3_2)-nd case unit to be used for protecting a supporting member which supports the main body of the anemometer, wherein third space created by combining the (3_1)-st case unit and the (3_2)-nd case unit has volume capable of holding the supporting member;
    wherein the (3_1)-st case unit and the (3_2)-nd case unit are engaged with the external frame where the supporting member of the anemometer is combined, to thereby allow the (1_1)-st case unit, the (1_2)-nd case unit, the (2_1)-st case unit, the (2_2)-nd case unit, the (3_1)-st case unit, and the (3_2)-nd case unit to be fixed as a whole.

2. The covering device of claim 1, wherein a frontal part of the propeller protecting part is shaped as a cone or a polypyramid to reduce air resistance during its movement.

3. The covering device of claim 1, wherein the supporting member protecting part includes (i) a first interior protecting unit and a second interior protecting unit which are engaged with each other to protect at least part of the supporting member, and (ii) a first exterior protecting unit and a second exterior protecting unit (ii-1) which protect at least part of the supporting member or protect the first interior protecting unit and the second interior protecting unit, from an outside of the first interior protecting unit and the second interior protecting unit, and (ii-2) whose degrees of overlapping the first interior protecting unit and the second interior protecting unit are adjustable, and
    wherein the covering device is adjusted by selecting one of three modes:
        (1) a first mode in which the first interior protecting unit and the second interior protecting unit are surrounded entirely by space created by combining the first exterior protecting unit and the second exterior protecting unit,
        (2) a second mode in which the first interior protecting unit and the second interior protecting unit are partly surrounded by the space created by combining the first exterior protecting unit and the second exterior protecting unit, and
        (3) a third mode in which the first interior protecting unit and the second interior protecting unit are not surrounded by the space created by combining the first exterior protecting unit and the second exterior protecting unit, and
    wherein the (3_1)-st case unit includes the first interior protecting unit and the first exterior protecting unit, and wherein the (3_2)-nd case unit includes the second interior protecting unit and the second exterior protecting unit.

4. The covering device of claim 3, wherein the external frame includes (i) at least one main frame to be used for fixing the anemometer and (ii) one or more supportive frames to be used for connecting the main frame and the moving body, wherein one or more first grooves are formed on inner surfaces of the first exterior protecting unit and the second exterior protecting unit, wherein one or more swellings are formed on the main frame, and wherein the first exterior protecting unit and the second exterior protecting unit are engaged with the main frame by combining the swellings and the first grooves, and wherein one or more second grooves are formed on outer surfaces of the first exterior protecting unit and the second exterior protecting unit, to thereby allow the supportive frames to pass through the second grooves and be tightly combined with the first exterior protecting unit and the second exterior protecting unit.

5. The covering device of claim 1, wherein the covering device includes (i) a first case, comprised of the (1_1)-st case unit, the (2_1)-st case unit, and the (3_1)-st case unit, which are configured as one body and (ii) a second case, comprised of the (1_2)-nd case unit, the (2_2)-nd case unit, and the (3_2)-nd case unit, which are configured as one body, and wherein the first case and the second case are engaged with each other.

6. The covering device of claim 5, wherein at least one first coupling member is formed on the first case, and wherein at least one second coupling member is formed on the second case, to be engaged with the first coupling member.

* * * * *